United States Patent [19]

Amano et al.

[11] Patent Number: 4,826,940

[45] Date of Patent: May 2, 1989

[54] METHOD FOR SUSPENSION POLYMERIZATION OF VINYL CHLORIDE MONOMER

[75] Inventors: Tadashi Amano; Yoshitaka Okuno, both of Ibaraki; Junichi Watanabe, Saitama, all of Japan

[73] Assignee: Shin Etsu Chemical Co., Ltd., Tokyo, Japan

[21] Appl. No.: 212,123

[22] Filed: Jun. 27, 1988

Related U.S. Application Data

[63] Continuation of Ser. No. 942,435, Dec. 16, 1986, abandoned.

[30] Foreign Application Priority Data

Dec. 16, 1985 [JP] Japan .................................. 60-283266

[51] Int. Cl.[4] ............................................... C08F 2/20
[52] U.S. Cl. ........................................ 526/61; 526/73; 526/84; 526/88
[58] Field of Search ..................... 526/61, 73, 84, 88

[56] References Cited

U.S. PATENT DOCUMENTS

| 3,468,859 | 9/1969 | Davies | 526/73 |
| 3,627,853 | 12/1971 | Bond | 526/73 |
| 3,661,867 | 5/1972 | Koyanagi | 526/73 |
| 3,956,251 | 5/1976 | Feiler | 526/73 |

*Primary Examiner*—Christopher Henderson

[57] ABSTRACT

The time taken for a run of suspension polymerization of vinyl chloride monomer can be remarkably decreased without affecting the quality of the resin product when the temperature of the polymerization mixture under polymerization is increased continuously or step-wise during the period in which the conversion of the monomer to polymer is 10% or larger in such a manner that the average degree of polymerization of the polymer taken at an intermediate stage by sampling is always in the range from 90% to 110% of that of the finally obtained polyvinyl chloride resin product.

3 Claims, No Drawings

METHOD FOR SUSPENSION POLYMERIZATION OF VINYL CHLORIDE MONOMER

This is a continuation of co-pending application Ser. No. 942,435 filed on Dec. 16, 1986, now abandoned.

BACKGROUND OF THE INVENTION

The present invention relates to an improved method for the suspension polymerization of vinyl chloride monomer or, more particularly, to a method for the suspension polymerization of vinyl chloride monomer in which the time taken for a run of the polymerization can be remarkably decreased without affecting the quality of the resultant polyvinyl chloride resin product in respect of the number of fish eyes, velocity of plasticizer absorption and so on.

As is well known, suspension polymerization vinyl chloride is performed in most cases in a batch-wise process, in which, conventionally, a polymerization reactor is charged with water for the aqueous medium, dispersing or suspending agent, polymerization initiator and vinyl chloride monomer together with or without other optional additives and the thus prepared polymerization mixture is heated under agitation at a prescribed polymerization temperature kept constant throughout the run to effect the polymerization of the monomer.

In compliance with the technological desire in recent years to increase the productivity in the above described process of the suspension polymerization of vinyl chloride, in particular, in respect of the utilization efficiency of, among others, the relatively expensive polymerization reactor, various attempts and proposals have been hitherto made for reducing the overall length of time taken for the completion of a run of the polymerization procedure composed not only of the time for the polymerization reaction per se but also of the times for the ex-reaction procedures including the time for the maintenance and cleaning of the polymerization reactor after the preceding run, the time taken for the introduction of the above mentioned constituents of the polymerization mixture into the reactor, the time for the evacuation of the reactor before the start of the polymerization reaction, the time for the discharge of the polymerizate slurry out of the polymerization reactor and so on.

Needless to say, reduction of the length of time taken for the polymerization reaction per se is of the major importance from the standpoint of increasing the overall productivity of the run so that attempts have also been made in this direction, for example, by increasing the polymerization temperature or by increasing the amount of the polymerization initiator introduced into the polymerization mixture. Such a conventional method, however, is practically not feasible because of the disadvantages that the polyvinyl chloride resin product produced by such a modified method may sometimes contain a greatly increased number of fish eyes and the velocity of plasticizer absorption into the resin product may be greatly decreased. The increase of the number of fish eyes, if alone, can be compensated by the addition of a small amount of a polymerization inhibitor to the polymerization mixture at the early stage of the polymerization reaction. This method of adding a polymerization inhibitor, however, more or less retards the polymerization reaction and also has a problem that the polyvinyl chloride resin product obtained thereby may sometimes be colored.

Accordingly, it is a very important technical problem requiring an urgent solution to develop an improved method for the suspension polymerization of vinyl chloride monomer in which the length of time taken for a run of the polymerization reaction can be reduced remarkably or significantly without affecting the quality of the resin product produced thereby.

SUMMARY OF THE INVENTION

It is therefore an object of the present invention to provide a novel and improved method for the suspension polymerization of vinyl chloride in which the length of time taken for a run of the polymerization reaction can be remarkably reduced while the quality of the polyvinyl chloride resin product produced thereby is not affected containing only a small number of fish eyes, having a high bulk density and capable of absorbing plasticizers at a high velocity.

Accordingly, the method of the present invention, which has been completed as a result of the extensive investigations undertaken with the above described object, comprises: introducing water for the aqueous polymerization medium, a dispersing agent, a polymerization initiator and vinyl chloride monomer into a polymerization reactor to form a polymerization mixture; heating the polymerization mixture under agitation to start the polymerization reaction; and controlling the temperature of the polymerization mixture under the polymerization reaction in such a manner that the average degree of polymerization of a polyvinyl chloride resin formed at an intermediate stage when the conversion of the vinyl chloride monomer into polymer is at least 10% is not smaller than 90% and not larger than 110% of the average degree of polymerization of the final polyvinyl chloride resin product.

DETAILED DESCRIPTION OF THE PREFERRED EMBODIMENTS

In a conventional process for the suspension polymerization of vinyl chloride monomer in an aqueous medium, in which the polymerization reactor is charged with water for the polymerization medium, dispersing agent, polymerization initiator and the monomer together with or without other optional additives to form a polymerization mixture which is heated under agitation to a prescribed polymerization temperature at which the polymerization reaction is performed keeping the temperature constant, it is a usual trend that the average degree of polymerization of the polyvinyl chloride resin taken out of the reactor by sampling at an intermediate stage of the polymerization reaction is subject to change as the polymerization reaction proceeds with increasing conversion of the monomer to polymer. This is presumably due to the large chain transfer coefficient to the polymerization initiator at the early stages of the reaction. This trend is more significant when the amount of the polymerization initiator added to the polymerization mixture is increased to be accompanied by the undesirable phenomena of an increased number of fish eyes contained in and a decreased velocity of plasticizer absorption of the polyvinyl chloride resin product produced thereby.

The scope of the inventive method consists in the continuous or stepwise increase of the temperature of the polymerization mixture, instead of keeping a constant temperature of the mixture throughout the polymerization reaction as in the prior art, in such a manner that the average degree of polymerization of the polyvinyl chloride resin taken by sampling at any intermediate stage of the polymerization reaction when the conversion of monomer to polymer is at least 10% is in the range from 90% to 110% of the average degree of polymerization of the polyvinyl chloride resin obtained as the final product after completion of the polymerization reaction. The actual method for increasing the polymerization temperature or for controlling the temperature is not particularly limitative but it may be a convenient way that the schedule of temperature elevation is planned on the base of the relationship between the monomer conversion and the average degree of polymerization of the resin sample at the intermediate stages obtained beforehand by experimentation of test polymerization runs for the desired particular formulation of the polymerization mixture at a constant polymerization temperature.

The average degree of polymerization of a polyvinyl chloride resin here implied can be determined according to the procedure specified in JIS K 6721 although several other methods can give equivalent results when an appropriate conversion factor is provided. The methods applicable include those specified in ISO 174, DIN 53725 and ASTM D-1245GPC, osmotic pressure method, light scattering method, centrifugal method and so on.

The essential requirement in the inventive method is to increase the polymerization temperature continuously or stepwise in the range from 10 to 80° C. during the polymerization reaction in such a controlled manner that the polymer taken from the polymerization mixture at an intermediate stage when the conversion of the monomer to polymer is in the range at least 10%, which is referred to as an intermediate polymer hereinbelow, has an average degree of polymerization in the range from 90% to 110% of the average degree of polymerization of the polyvinyl chloride resin obtained as the final product. It is an experimentally established fact that variation in the average degree of polymerization of the polymer produced at the very early stage of the polymerization, for example, when the conversion of the monomer to polymer is smaller than 10% has little influence on the quality of the finally obtained polyvinyl chloride resin product.

On the contrary, variation in the average degree of polymerization of the polymer produced at a later stage of polymerization when the conversion of the monomer is 10% or larger, i.e. an intermediate polymer, has a profound influence on the quality of the final product. In this regard, the inventors have conducted extensive experimental investigations and arrived at a conclusion that the average degree of polymerization of the intermediate polymer taken by sampling from the polymerization mixture under proceeding reaction at any intermediate stage should desirably be in the range from 90% to 110% of the value of the polyvinyl chloride resin as the final product after a moment when the conversion of the monomer to polymer has reached 10%. When the average degree of polymerization of the intermediate polymer is smaller than 90% or larger than 110% of the value of the finally obtained polyvinyl chloride resin product, the resin product may contain an increased number of fish eyes and the velocity of plasticizer absorption thereof may be disadvantageously decreased. The polymerization temperature should be controlled within a range from 10 to 80° C. since the polymerization reaction can hardly proceed at an industrially practicable velocity at a temperature lower than 10° C. while increase of the polymerization temperature higher than 80° C. may cause disadvantages such as coloration of the resin product.

The water introduced into the polymerization reactor as the aqueous polymerization medium may be at room temperature or may be pre-heated with an object to decrease the time taken for the temperature elevation of the polymerization mixture formed in the reactor to start the polymerization reaction. It is of course optional that the dispersing or suspending agent and other additives are dispersed or dissolved in advance in the water introduced into the reactor.

The above mentioned dispersing agent may be any of conventional ones used in the suspension polymerization of vinyl chloride including water-soluble polymers such as water-soluble cellulose derivatives, e.g. methyl cellulose, hydroxyethyl cellulose, hydroxypropyl cellulose, and hydroxypropyl methyl cellulose, partially saponified polyvinyl alcohols, polymers of acrylic acid and related monomers, gelatine and the like, monomer-soluble surface active agents such as sorbitan monolaurate, sorbitan trioleate, glycerin tristearate, block copolymers of ethylene oxide and propylene oxide and the like and water-soluble surface active agents such as polyoxyethylene sorbitan monolaurate, polyoxyethylene glycerin oleate, sodium laurate and the like. These dispersing agents may be added to the polymerization mixture either alone or as a combination of two kinds or more accordign to need.

The type of the polymerization initiator is also not particularly limitative and any of those conventionally used in the suspension polymerization of vinyl chloride can be used including organic percarbonate compounds such as diisopropyl peroxy dicarbonate, di-2-ethylhexyl peroxy dicarbonate, diethoxyethyl peroxy dicarbonate and the like, perester compounds such as tert-butyl peroxy neodecanoate, α-cumyl peroxy neodecanoate,2,4,4-trimethylpentyl peroxy neodecanoate and the like, organic peroxides such as acetyl cyclohexyl sulfonyl peroxide, 2,4,4-trimethylpentyl-2-peroxy phenoxy acetate and the like and azo compounds such as azobis-2,4-dimethyl valeronitrile, azobis(4-methoxy-2,4-dimethyl)valeronitrile and the like as well as inorganic peroxides such as potassium persulfate, ammonium persulfate, hydrogen peroxide and the like. These polymerization initiators can be used either alone or as a combination of two kinds or more. The polymerization mixture can be further admixed with various kinds of other additives including polymerization moderators, chain transfer agents, polymerization inhibitors, gelation improvers, antistatic agents, pH controlling agents and the like each in a limited amount.

The method of the present invention is applicable not only to the homopolymerization of vinyl chloride monomer alone but also copolymerization of vinyl chloride with other comonomers copolymerizable therewith provided that the monomer mixture contains a major amount, e.g. 50 % by weight or more, of vinyl chloride. Monomers copolymerizable with vinyl chloride are exemplified by vinyl esters, e.g. vinyl acetate and vinyl propionate, esters of acrylic or methacrylic acid, e.g. methyl acrylate, methyl methacrylate and ethyl acrylate, olefins, e.g. ethylene and propylene, maleic anhydride, acrylonitrile, styrene, vinylidene chloride and the like.

In practicing the method of the present invention, the amounts or proportion of the respective constituents of the polymerization mixture may be conventional as in the suspension polymerization of vinyl chloride in the prior art without particular limitations. According to the method of the present invention, an industrially very economical means can be provided for the manufacture of vinyl chloride-based resin products of high quality having a high bulk density and capable of absorbing plasticizers at a high velocity.

In the following, examples are given to illustrate the inventive method in more detail but not to limit the scope of the invention in any way.

EXAMPLE 1.

Into a stainless steel-made polymerization reactor of 2.1 m3 capacity were introduced 900 kg of deionized water, 600 g of a partially saponified polyvinyl alcohol and 252 g of di-2-ethylhexyl peroxy dicarbonate and, after evacuation of the reactor to have a pressure of 40 mmHg, 600 kg of vinyl chloride monomer were introduced into the reactor to form a polymerization mixture. The temperature of the polymerization mixture under agitation with the stirrer was increased to 47° C. taking 10 minutes and thereafter further increased at a constant rate of temperature elevation of 0.045° C./minute. When the temperature had reached 63° C. with a pressure drop down to 7.0 kg/cm2G, 90 g of bisphenol A were added to the polymerization mixture to terminate the polymerization reaction followed by discharge and recovery of the unreacted monomer. The polymerizate slurry was discharged out of the reactor, dehydrated and dried. The conversion of the vinyl chloride monomer to polymer was 86%. The overall length of time for the polymerization was 6 hours and 5 minutes. The thus obtained final product of polyvinyl chloride resin was subjected to the evaluation of various properties including the average degree of polymerization, particle size distribution by screening test, amount of plasticizer absorption, velocity of plasticizer absorption, number of fish eyes and initial coloration to give the results shown in Table 1 below, which also includes the results obtained in Example 2 and Comparative Examples 1 and 2 described below In the course of the above described polymerization procedure, a small portion of the polymerization mixture was taken out of the reactor three times at the moments when the conversion of the monomer to polymer was 15%, 40% and 70%. These intermediate polymers had average degrees of polymerization of 1090, 1060 and 1040, respectively.

EXAMPLE 2.

The procedure for the suspension polymerization of vinyl chloride was substantially the same as in Example 1 excepting the schedule of temperature elevation. Namely, temperature of the polymerization mixture was increased up to 52° C. taking 20 minutes and the polymerization reaction was performed at this temperature for 3 hours. Thereafter, the temperature was again increased up to 60° C. taking 10 minutes and the polymerization reaction was continued at this temperature until the pressure inside the reactor had dropped to 6.6 kg/cm2G when the reaction was terminated by adding bisphenol A to the polymerization mixture. The conversion of the monomer to polymer was 87% and the overall time taken for the polymerization reaction was 6 hours and 15 minutes.

In the course of the above described polymerization procedure, a small portion of the polymerization mixture was taken out of the reactor three ti mes at the moments when the conversion of the monomer to polymer was 20%, 45% and 72%. These intermediate polymers had average degrees of polymerization of 1050, 1060 and 1040, respectively.

COMPARATIVE EXAMPLE 1.

The procedure for the suspension polymerization of vinyl chloride was substantially the same as in Example 1 excepting the schedule of temperature elevation. Namely, temperature of the polymerization mixture was increased up to 57° C. taking 30 minutes and the polymerization reaction was performed at this temperature until the pressure inside the reactor had dropped to 5.5 kg/cm2G when the reaction was terminated by adding bisphenol A to the polymerization mixture. The conversioon of the monomer to polymer was 87% and the overall time taken for the polymerization reaction was 7 hours.

In the course of the above described polymerization procedure, a small portion of the polymerization mixture was taken out of the reactor three times at the moments when the conversion of the monomer to polymer was 20%, 38% and 70%. These intermediate polymers had average degrees of polymerization of 800, 890 and 980, respectively.

COMPARATIVE EXAMPLE 2.

The procedure for the suspension polymerization of vinyl chloride was substantially the same as in Comparative Example 1 except that the amount of di-2-ethylhexyl peroxy dicarbonate was increased to 312 g and the polymerization reaction was terminated by adding 6 g of tert-butyl hydroxy anisole to the polymerization mixture. The conversion of the monomer to polymer was 87% and the overall time taken for the polymerization reaction was 6 hours and 7 minutes.

Following is a description of the procedures for the evaluation of the polyvinyl chloride resin products obtained in the Examples and Comparative Examples described above to give the results shown in Table 1.

(1) Average degree of polymerization:according to JIS K 6721

(2) Bulk density:according to JIS K 6721

(3) Particle size distribution:according to JIS Z 8801 using screens of 60, 100 and 200 mesh openings (4) Amount of plasticizer absorption:a cylindrical vessel of an aluminum alloy having an inner diameter of 25 mm and a depth of 85 mm containing glass wool packed on the bottom and 10 g of the sample resin put thereon together with 15 ml of dioctyl phthalate as a plasticizer was, after standing for 30 minutes to have the plasticizer fully absorbed in the resin, subjected to centrifugal separation under a centrifugal force of 1500 G so that the unabsorbed amount of the plasticizer was removed to give the amount of the absorbed plasticizer in parts by weight per 100 parts by weight of the resin.

(5) Velocity of plasticizer absorption: 400 g of the sample resin were introduced into the reservoir of a Brabender plastograph equipped with a stirrer, of which the temperature of the jacket was kept at 80° C., and the resin was preheated for 4 minutes with agitation followed by introduction of 200 g of dioctyl phthalate to determine the time taken for drying up.

(6) Number of fish eyes: a 25 g portion of a resin compound composed of 100 parts by weight of the sample resin, 1 part by weight of tribasic lead sulfate, 1.5 parts by weight of lead stearate, 0.2 part by weight of titanium dioxide, 0.1 part by weight of carbon black and 50 parts by weight of dioctyl phthalate was kneaded for 5 minutes on a roller mill kept at 145° C. followed by sheeting into a sheet havig a thickness of 0.2 mm, of which the number of translucent particles was counted.

(7) Initial coloration: a resin compound composed of 100 parts by weight of the sample resin, 1 part by weight of tin laurate, 0.5 part by weight of a cadmium-containing stabilizer and 50 parts by weight of dioctyl phthalate was kneaded for 5 minutes on a roller mill kept at 150° C. followed by sheeting into a sheet having a thickness of 0.85 mm and a width of 220 mm and a metal mold having a cavity of 40 mm by 40 mm by 15 mm was filled with 28 g of cut strips of the sheet followed by compression molding thereof at 160° C. for 5 minutes under a compressive pressure of 70 kg/cm2 to give a molded piece of the resin compound which was visually inspected to evaluate the degree of coloration and transparency in two grades of A, for a quite acceptable appearance, and B, for an appearance unaccetable as a commercial product.

TABLE 1

|  | Example | | Comparative Example | |
|---|---|---|---|---|
|  | 1 | 2 | 1 | 2 |
| Average degree of polymerization | 1020 | 1030 | 1030 | 1030 |
| Bulk density, g/cm³ | — | — | — | 0.525 |
| % by weight,         60 mesh | 100 | 100 | 100 | 100 |
| passing through    100 mesh | 56.2 | 49.3 | 64.0 | 82.9 |
| screen of             200 mesh | 0.6 | 0.5 | 0.9 | 0.8 |
| Amount of plasticizer absorption, % | 24.5 | 24.3 | 25.0 | 24.9 |
| Velocity of plasticizer absorption, minutes | 17.0 | 16.8 | 20.2 | 19.8 |

TABLE 1-continued

|  | Example | | Comparative Example | |
|---|---|---|---|---|
|  | 1 | 2 | 1 | 2 |
| Fish eyes, pieces/100 cm² | 1 | 2 | 20 | 1 |
| Initial coloration | A | A | A | B |

What is claim is:

1. A method for the suspension polymerization of vinyl chloride monomer in an aqueous polymerization medium which comprises: introducing water for the aqueous polymerization medium, a dispersing agent, a polymerization initiator and vinyl chloride monomer into a polymerization reactor to form a polymerization mixture; heating the polymerization mixture under agitation to start the polymerization reaction; and controlling the temperature of the polymerization mixture under the polymerization reaction in such a manner that the average degree of polymerization of a polyvinyl chloride resin formed at an intermediate stage when the conversion of the vinyl chloride monomer into polymer is at least 10%, the average degree of polymerization of the polyvinyl chloride at the intermediate state being deductively determined from the results of preliminary tests for determining the relationship between the polymerization temperature or the rate of temperature elevation and the average degree of polymerization of the polymer product at the intermediate stages is not smaller than 90% and not larger than 110% of the average degree of polymerization of the final polyvinyl chloride resin product.

2. The method for the suspension polymerization of vinyl chloride monomer as claimed in claim 1 wherein the temperature is controlled to increase continuously or step-wise.

3. The method for the suspension polymerization of vinyl chloride monomer as claimed in claim 1 wherein the temperature is controlled within the range from 10 to 80° C.

* * * * *